(12) United States Patent
Margolin et al.

(10) Patent No.: US 11,741,062 B2
(45) Date of Patent: Aug. 29, 2023

(54) DATA STRUCTURE MANAGEMENT SYSTEM

(71) Applicant: PayPal, Inc., San Jose, CA (US)

(72) Inventors: Itay Margolin, Pardesiya (IL); Alon Dourban, Tel Aviv (IL)

(73) Assignee: PAYPAL, INC., San Jose, CA (US)

( * ) Notice: Subject to any disclaimer, the term of this patent is extended or adjusted under 35 U.S.C. 154(b) by 189 days.

(21) Appl. No.: 17/393,917

(22) Filed: Aug. 4, 2021

(65) Prior Publication Data
US 2023/0043217 A1   Feb. 9, 2023

(51) Int. Cl.
*G06F 16/215*   (2019.01)
*G06F 40/284*   (2020.01)
*G06F 16/23*    (2019.01)
*G06F 16/2458*  (2019.01)
*G06F 16/2455*  (2019.01)
*G06F 16/25*    (2019.01)

(52) U.S. Cl.
CPC ........ *G06F 16/215* (2019.01); *G06F 16/2365* (2019.01); *G06F 16/2456* (2019.01); *G06F 16/2468* (2019.01); *G06F 16/258* (2019.01); *G06F 40/284* (2020.01)

(58) Field of Classification Search
CPC .............. G06F 16/215; G06F 16/2468; G06F 16/2456; G06F 16/258; G06F 16/2365; G06F 40/284

USPC ......................................................... 707/692
See application file for complete search history.

(56) References Cited

U.S. PATENT DOCUMENTS

| | | | |
|---|---|---|---|
| 2013/0262086 A1* | 10/2013 | Kim ...................... | G06F 40/205 704/9 |
| 2016/0063094 A1* | 3/2016 | Udupa ................. | G06Q 10/107 707/748 |
| 2017/0300698 A1* | 10/2017 | Chawla ................ | G06F 21/577 |
| 2017/0374093 A1* | 12/2017 | Dhar .................... | G06Q 50/265 |
| 2019/0065470 A1* | 2/2019 | Matthews .............. | G06N 7/01 |
| 2020/0210465 A1* | 7/2020 | Upadhyay ........... | G06F 16/3337 |
| 2022/0171800 A1* | 6/2022 | Kumaresan ........... | G06F 16/355 |

* cited by examiner

*Primary Examiner* — Giovanna B Colan
(74) *Attorney, Agent, or Firm* — Haynes and Boone, LLP

(57) ABSTRACT

A computing device generates a first token for first data content that is associated with a first relationship and a second relationship, and a second token for second data content that is associated with the first relationship and a third relationship, such that the first token and second token are generated based on a frequency of use of data values included in the first and the second data content. The computing device calculates a first similarity score of data values from third data content that is associated with the second relationship and a fourth relationship with data values from fourth data content that is associated with the third relationship and the fourth relationship in response to the first and second token matching. The computing device then performs, in response to the first similarity score satisfying a similarity threshold, a first modification to any of the data content.

17 Claims, 11 Drawing Sheets

| DATA VALUE | NUMBER OF OCCURRENCES | TOKEN VALUE |
|---|---|---|
| THE | 50000 | .301 |
| CAKE | 25 | 3.602 |
| STORE | 2000 | 1.699 |
| CATS | 100 | 3 |
| LTD | 2500 | 1.602 |
| SHOE | 500 | 2.301 |
| PALACE | 15 | 3.824 |
| VEGAN | 30 | 3.523 |
| SUPPLY | 125 | 2.903 |
| SHOES | 130 | 2.886 |
| DESIGNER | 228 | 2.642 |
| FURNITURE | 500 | 2.301 |
| ⋮ | | |
| NTH WORD | *** | *** |

FIG. 5

| ID | BUSINESS NAME | BUSINESS OWNER | ADDRESS | PHONE | EMAIL | URL |
|---|---|---|---|---|---|---|
| 1/5 | THE CAKE STORE / CAKE STORE LTD | DEBORAH/ DEB WEISS | 2777 OAK STREET, NEW YORK, NY | 315-369-5721 | DEB.W@MAIL.COM | NULL |
| 2 | CATS STORE LTD | DEBORAH WEISS | 3193 OAKWOOD AVENUE, NEW YORK, NY | 917-358-2940 | DEBORAHW123@MAIL.COM | NULL |
| 3/7 | SHOE PALACE/ SHOES PALACE | SPENCER/ S. JENNINGS | 965 GODFREY ROAD, NEW YORK, NY | 212-536-1199 | SPEN@MAIL.COM | THESHOEPALACE.COM |
| 4 | VEGAN SUPPLY | RICK L. ARMUNDSEN | 3193 OAKWOOD AVENUE, NEW YORK, NY | 631-576-9676 | RAMUNDEN@MAIL.COM | VEGANSUPPLY.COM |
| 6 | DESIGNER FURNITURE | FRANCIS B. POWELL | 3239 ABIA MARTIN DRIVE, NEW YORK, NY | 327-393-5773 | DRPOWELL82@MAIL.COM | DESIGNERFURNITURE.COM |
| 8 | CAKE SUPPLY | BOB BOWIE | 3381 LAKE ST, DULUTH, MN | 218-254-5610 | CAKESUPPLY@MAIL.COM | CAKESUPPLY.COM |

FIG. 10

DATA STRUCTURE MANAGEMENT SYSTEM

FIELD OF INVENTION

The present specification generally relates to data structure management, and more specifically to managing a database of one or more data structures that include data content instances according to various embodiments of the disclosure.

BACKGROUND

Data structures that include data content are often generated by services and applications in computer systems and computer networks for various reasons. For example, data structures may include data objects, data arrays, data records, data tables, and/or other data structures that include a collection of data values and relations between those data values. For example, a data record may be in the form of a data table that includes a number of rows and columns that form a plurality of cells. Those cells may include data content such as textual content, numerical content, symbol content, visual content, audio content, and/or any other content that would be apparent to one of skill in the art in possession of the present disclosure. Over time, an enterprise may manage a large number of data structures and those data structures may also grow to include a large amount of data content instances. Storing a large number of data structures that include a relatively large amount of data content instances can be costly in terms of storage costs as well as time costs in locating and accessing data content instances in those data structures. As such, enterprises often manage their data structures to remove duplicative data content instances that include the same data values, condense data structures into fewer data structures, and/or perform other structure management actions. However, current data management solutions can be time consuming and/or inaccurate. Thus, a problem exists regarding managing data structures in a database to maximize database storage, maximize accuracy of data structure management, and minimize time to perform data structure management.

BRIEF DESCRIPTION OF FIGURES

FIG. 5 is a table illustrating a data structure dictionary generated during the method of FIG. 3 according to an embodiment of the present disclosure;

FIG. 10 is a table illustrating the merging of the two data tables of FIG. 4 during the method of FIG. 3 according to an embodiment of the present disclosure.

Figure 1:
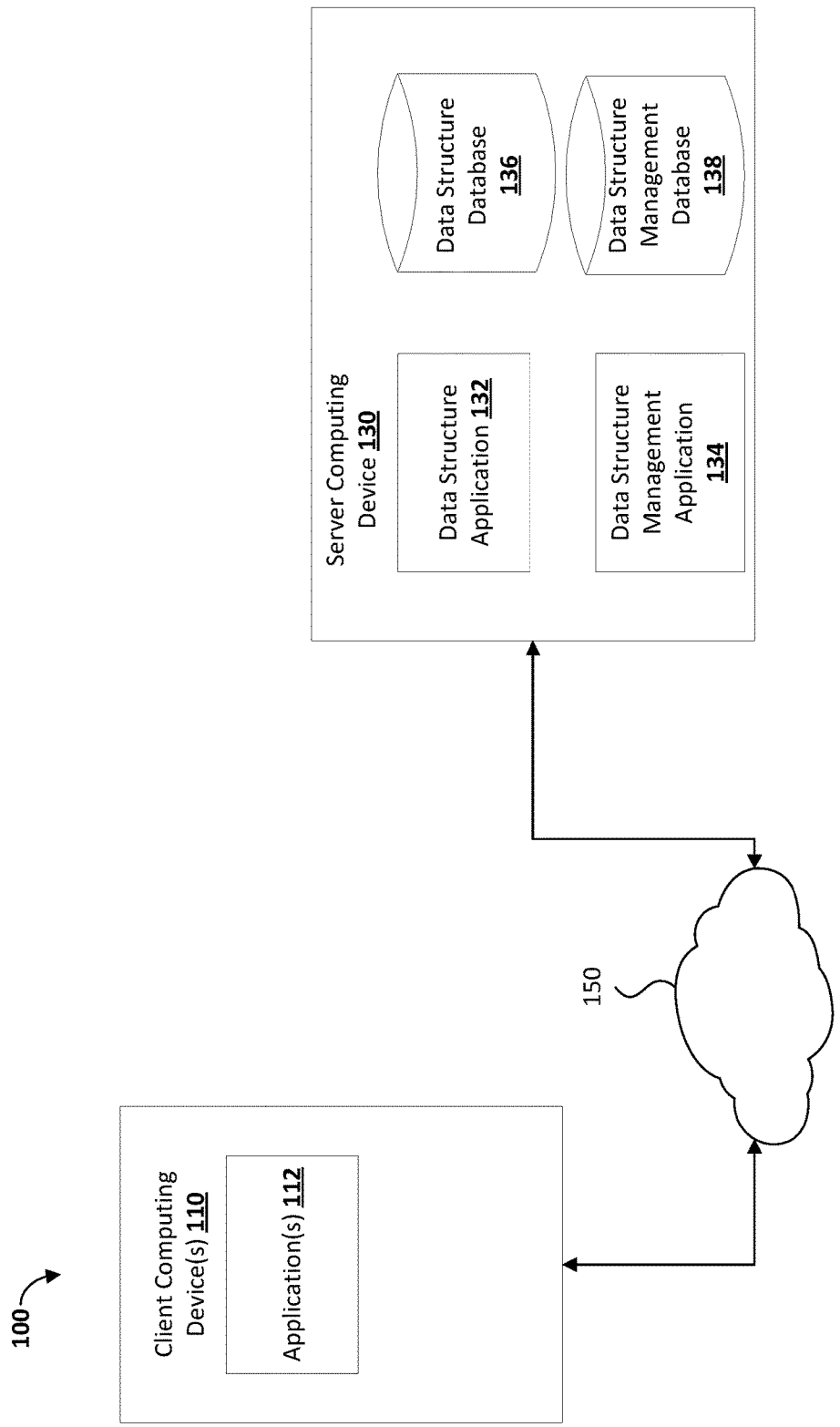
FIG. 1 is a block diagram illustrating a networked system according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes methods and systems for managing data structures (e.g., data objects, arrays, records, tables, files, and/or any other data structure) that include data content (e.g., textual content, numerical content, symbol content, visual content, audio content, and/or any other content). As referred to herein, text content may include textual content, numerical content and/or symbol content and as such may include alphanumeric characters as well as symbols, mathematical operators, logograms, etc. As discussed above, data structures may be stored in a database with many other data structures, and data content instances and/or data values within the data structures may be repetitive, and/or the data structures themselves may be repetitive. As such, some data structures, if not managed by an enterprise, may collectively consume a large amount of storage resources and become difficult to locate specific data values.

To solve these issues with data structures, enterprises or managers of the data structures rely on data structure management operations such as merging to remove and condense the data structure(s). However, merging two non-key related data structures is a common challenge for enterprises such as when, for example, the enterprise acquires a new startup or purchases data from a third-party vendor. The data content from a first entity and the data content from a second entity may not have a unique key that enables the data content from the two entities to be merged together. Furthermore, data content from each data structure may be noisy/vary, incomplete, and/or inaccurate that makes automatic merging of the data structures difficult from the perspective of a computing device using a merging algorithm.

Current data management systems may merge data structures using strict joining operations by joining data content instances that are associated with common data content instances in each data structure. For example, data content associated with a business name may be merged with any data content in another data structure that is associated with a data content instance that includes the same exact business name. This technique relies on the underlying assumption that the same alias for the business will be used in each data structure. This data management structure operation is very simple, easy to implement, and very fast to compute. However, strict joining can be relatively inaccurate where different businesses have the same alias, or the same business has different aliases. In other examples, strict merging may be used with other data values that are relatively more unique (e.g., using phone numbers). However, these data content instances may be lacking in some data structures, and/or the data values may be lacking within the data content instance itself.

Other data management techniques for merging data structures may include fuzzy joining where a similarity metric between data content instances in separate data structures may be used to determine whether a similarity score is higher than some threshold. If the similarity score is higher than the threshold, then those data instances may be merged. Unlike any strict joining, the fuzzy model can merge data structures even if both records do not have any common data content. However, without any exact match joining, some data content instances may be a candidate to join with other data content, which may lead to an enormous number of potential matches. Thus, this data management technique may be unfeasible in large datasets.

A hybrid of strict joining and fuzzy joining may also be used where a first data content instance has an exact strict match to a second data content instance, and where the first data content instance and the second data content instance are associated with a first relationship (e.g., both data content instances are a business name, an address, a phone number, a user name, and/or other relationships). The first data content instance may also be associated with a third data content instance according to a second relationship such that the second relationship may not be associated with the second data content instance. Furthermore, the second data content instance may be associated with a fourth data content instance according to a third relationship such that the third relationship may not be associated with the first data content instance. The third data content instance and the fourth data content instance may be associated with each other according to a fourth relationship, and the third data content instance and the fourth data content instance may be compared using the fuzzy algorithm. For example, the first data content instance and the second data content instance may include "SHOES PALACE" while the third data content instance may include "SPENCER JENNINGS" and the fourth data content instance may include "S. JENNINGS". Because both instances of "SHOES PALACE" are a strict match and "SPENCER JENNINGS" and "S. JENNINGS" satisfy a similarity threshold, then those data content instances may be merged. This data management technique has very few false merges and high coverage. However, this data management technique cannot deal well with too common of data values, the data instances that are used for the strict match can be noisy leading to misses, calculation of a distance between two strings is a difficult task and therefore the technique is slow.

The systems and methods of the present disclosure extend the hybrid strict joining and fuzzy matching technique that enables the high coverage of fuzzy matching without compromising the computational performance of strict joining. The systems and methods of the present disclosure generate potential merging candidates by applying a first filtering layer based on the strict matching. However, instead of strict matching the data values of the data content instances, the systems and methods of the present disclosure generate a token for those data values based on the frequency that the data values are used in data structures. For example, the systems and methods of the present disclosure may use an inverse document frequency technique to determine which data value of the data values included in a data content instance is the "core data value" (e.g., a unique or rarest data value of the data values in the data content instance relative to the data values in a corpus set of data content instances). As such, the token for the data content instance may be the sub-token for the data value included in the data content instance that is least frequent in the corpus set of data values. The systems and methods of the present disclosure may then perform strict matching of the data value represented by each token and/or of each token to generate a set of potential candidates of data content instances. Other data content instances associated the potential candidates may then be used to perform the similarity matching based on a similarity score, according to a second filtering layer. As such, systems and methods of the present disclosure provide, when performing data structure management operations, a relatively small candidate population (therefore computationally feasible) and yet with high coverage.

FIG. 1 illustrates a networked system 100 according to an embodiment of the present disclosure. The networked system 100 includes at least one client computing device 110 and/or at least one server computing device 130 that may be communicatively coupled with each other via a network 150. The network 150, in one embodiment, may be implemented as a single network or a combination of multiple networks. For example, in various embodiments, the network 150 may include the Internet and/or one or more intranets, landline networks, wireless networks, and/or other appropriate types of communication networks. In another example, the network 150 may comprise a wireless telecommunications network (e.g., cellular phone network) adapted to communicate with other communication networks, such as the Internet.

The client computing device 110 may include, for example, an external network resource that may be utilized by a user to interact with the server computing device 130 that may include an internal network resource over the network 150. For example, the user may use the client computing device 110 to conduct an online purchase transaction with the server computing device 130 via a website hosted by the server computing device 130, a mobile application associated with the server computing device 130, a point-of-sale (POS) system associated with the server computing device 130, an electronic mail communication system associated with the server computing device 130, and/or any other service that may provide, generate, and/or receive data structures that include data content (e.g., textual content, numerical content, symbol content, visual content, audio content, and/or any other content). As referred to herein, text content may include textual content, numerical content and/or symbol content and as such may include alphanumeric characters as well as symbols, mathematical operators, logograms, character strings, words, phrases, and/or any other text content that would be apparent to one of skill in the art in possession of the present disclosure. The client computing device 110, in various embodiments, may be implemented using any appropriate combination of hardware and/or software configured for wired and/or wireless communication over the network 150. In various implementations, the client computing device 110 may include at least one of a wireless cellular phone, a wearable computing device, a personal computer, a laptop, etc.

The client computing device 110, in one embodiment, may include an application 112 such as, for example, an external application (e.g., a client application such as, for example, a web browser, a mobile payment application, an electronic mail application, a POS application, and/or any other web application), which may be utilized by the user to conduct electronic transactions (e.g., online payment transactions, etc.) with the server computing device 130 over the network 150, send or receive emails via the server computing device 130, play games, or any other client/server interaction that would be apparent to one of skill in the art in possession of the present disclosure. The client computing device 110 may also include at least one computing device identifier, which may be implemented, for example, as an IP address, operating system registry entries, cookies associated with the application 112, identifiers associated with hardware of the client computing device 110 (e.g., a media control access (MAC) address), network domain information, and/or various other appropriate identifiers. Even though only one client computing device 110 is shown in FIG. 1, it is contemplated that one or more external network resources (each similar to the client computing device 110) may be communicatively coupled with the server computing device 130 via the network 150 within the networked system 100.

The server computing device 130, in various embodiments, may be maintained by an operating entity (or in some cases, by a partner of an operating entity that processes transactions on behalf of the operating entity). Examples of operating entities include but are not limited to merchant sites, resource information sites, utility sites, real estate management sites, social networking sites, email or messaging sites, payment service provider sites, and/or any other service provider that would be apparent to one of skill in the art in possession of the present disclosure, which offer various services accessible over the network 150. Even though only one server computing device 130 is shown in FIG. 1, it has been contemplated that one or more internal network resources (each similar to the server computing device 130) may be accessible to one or more external network resources that are provided by the client computing device 110 via the network 150 within the networked system 100.

The server computing device 130, in one embodiment, may include a data structure application 132, which may be configured to provide, generate, and/or receive data structures that include text content over the network 150 to the application 112 of the client computing device 110. For example, the user of the client computing device 110 may interact with the data structure application 132 through the application 112 over the network 150 to request information, conduct a commercial transaction, send or receive email communications, store and/or retrieve data structures, or otherwise interact with the data structure application 132. The server computing device 130, in one embodiment, may include at least one computing device identifier, which may identify the server computing device 130 and/or the data structure application 132 being accessed by the application 112. In one implementation, the computing device identifier may include a server identifier (e.g. hostname, IP address), application identifier (e.g., URL, application name), and/or other identifier that identifies a server computing device 130 that would be apparent to one of skill in the art in possession of the present disclosure. The computing device identifier may include attributes related to the server computing device 130, such as identification information (e.g., a serial number, a location address, GPS coordinates, a network identification number, etc.).

The server computing device 130, in one embodiment, may be configured to access and/or maintain data needed by the data structure application 132 in a data structure database 136. For example, the data structure database 136 may include historical data structures provided, received, and/or generated via the data structure application 132. The data structures may include one or more data content instance that includes one or more data values. For example, the data content may be associated with each other according to relationships (e.g. unions, sets, and/or other mathematical operators) such that the data values included in the data content are related. In a specific example, data structures are stored in the data structure database 136 and may include account records of users of a payment service provided by the data structure application 132. As such, the data content may include data values that may be text content. In other examples, the data structure database 136 may include data structures from an entity that has been merged with the entity associated with the server computing device 130. However, other data structure databases 136 may be contemplated. While the data structure database 136 is illustrated as a single database provided in the server computing device 130, one of skill in the art in possession of the present disclosure will recognize that the data structure database 136 may include a plurality of databases, and/or may be directly coupled to the server computing device 130 and/or coupled to the server computing device 130 via the network 150.

The server computing device 130, in various embodiments, may include a data structure management application 134, which may be configured to manage data structures stored in the data structure database 136, as discussed in further detail below. For example, the data structure management application 134 may process data structures gathered from the data structure database 136 to determine redundancy in data values in the data structures and/or in data structures themselves such that the data structure management application 134 may perform one or more data structure management operations on those data structures and/or data values to merge, compress, remove, update, and/or other data structure management operations on the data values and/or the data structures. Furthermore, the data structure management application 134 may be implemented as executable computer instructions stored on a computer-readable medium.

In various embodiments, the data structure management application 134 may be configured to access and/or maintain data needed by the data structure management application 134 in a data structure management database 138. For example, the data structures management database 138 may include various data structure dictionaries used by the data structure management application 134 in determining the redundancy of data structures in the data structure database 136, as discussed in more detail below. While the data structure management database 138 is illustrated as a single database provided in the server computing device 130, one of skill in the art in possession of the present disclosure will recognize that the data structure management database 138 may include a plurality of databases, and/or may be directly coupled to the server computing device 130 and/or coupled to the server computing device 130 via the network 150. Furthermore, while the data structure management application 134 and the data structure application 132 are illustrated as being provided by the server computing device 130, one of skill in the art in possession of the present disclosure will recognize that separate server computing devices that are coupled to each other via the network 150 may provide the data structure management application 134 and/or the data structure application 132. While a specific networked system 100 has been illustrated and described, one of skill in the art in possession of the present disclosure will recognize that the networked system 100 of the present disclosure may include a variety of components and component configurations while remaining within the scope of the present disclosure as well.

Figure 2:
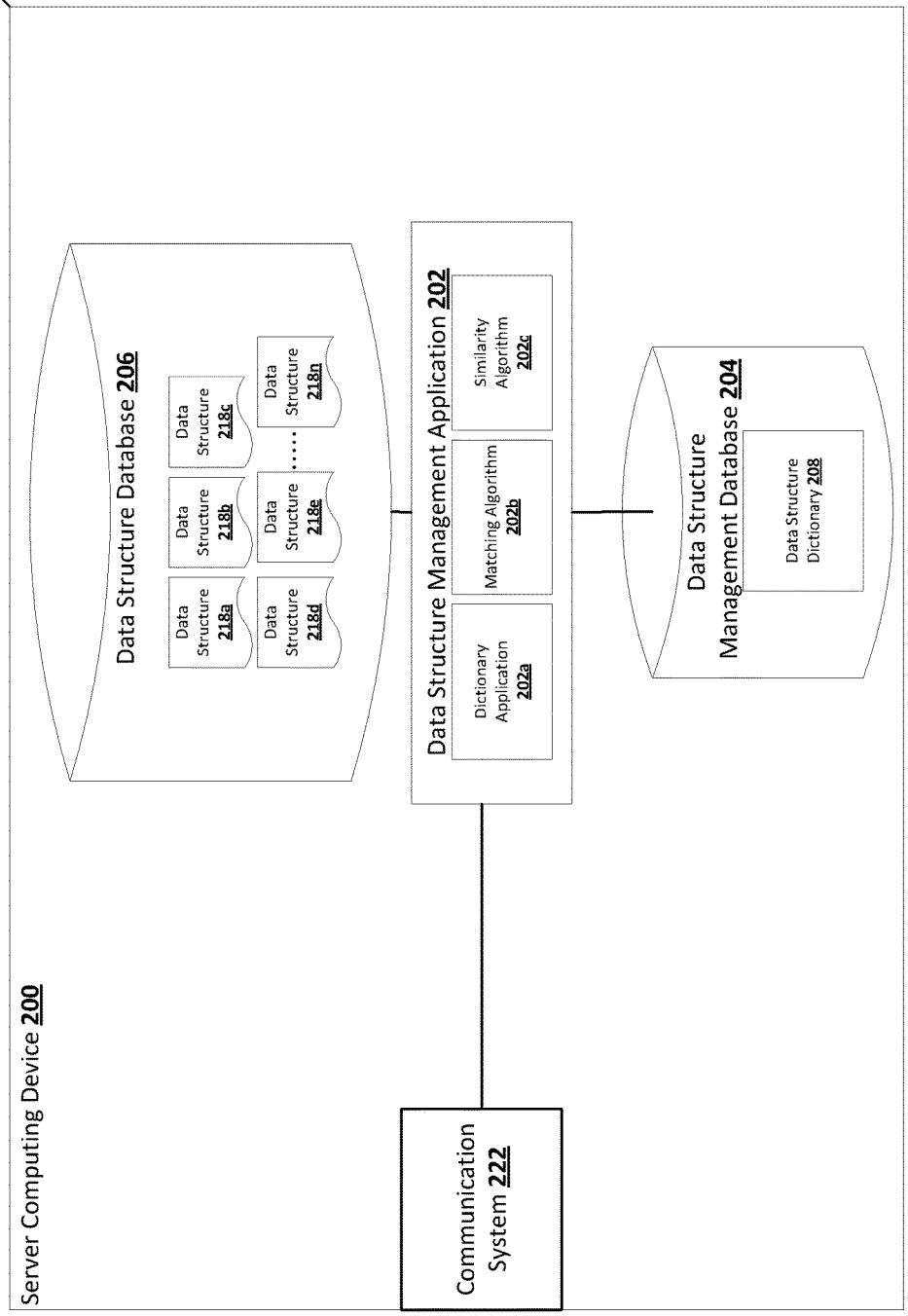
FIG. 2 is a block diagram illustrating a server computing device of the networked system of FIG. 1 according to an embodiment of the present disclosure.

Referring now to FIG. 2, an embodiment of a server computing device 200 is illustrated. In an embodiment, the server computing device 200 may be the server computing device 130 discussed above. In the illustrated embodiment, the server computing device 200 includes a chassis 201 that houses the components of the server computing device 200, only some of which are illustrated in FIG. 2. For example, the chassis 201 may house a processing system (not illustrated) and a non-transitory memory system (not illustrated)

that includes instructions that, when executed by the processing system, cause the processing system to provide a data structure management application 202 (that may be the data structure management application 134 of FIG. 1) that is configured to perform the functions of the data structure management applications and/or the server computing devices discussed below. Furthermore, the chassis 201 may also house a storage device (not illustrated) that is coupled to the data structure management application 202 (e.g., via a coupling between the storage device and the processing system). The storage device may provide a data structure management database 204 (that may be the data structure management database 138 of FIG. 1) that is configured to store the rules and/or other data utilized by the data structure management application 202 in order to provide the functionality discussed below. For example, the data structure management database 204 may include a data structure dictionary 208 discussed in further detail below. Further yet, the storage device or a separate storage device that is coupled to the data structure management application 202 may include a data structure database 206 (that may be the data structure database 136 of FIG. 1) that stores data structures associated with the data structure application 132 of FIG. 1. For example, the data structure database 206 may include data structures 218a, 218b, 218c, 218d, 218e, and/or up to 218n.

In various embodiments, the data structure management application 202 may be software or instructions stored on a computer-readable medium and may include a plurality of algorithms. For example, the data structure management application 202 may include a dictionary application 202a that is configured to perform the functions of the dictionary applications and the server computing devices discussed below such as, for example, generating and managing the data structure dictionary 208. In another example, the data structure management application 202 may include a matching algorithm 202b that is configured to perform the functions of the matching algorithms and the server computing devices discussed below such as, for example, performing strict matching operations. In another example, the data structure management application 202 may include a similarity algorithm 202c that is configured to perform the functions of the similarity algorithms and the server computing devices discussed below such as, for example, performing fuzzy matching operations using similarity scores. However, one of skill in the art in possession of the present disclosure will recognize that the data structure management application may include other applications and algorithms that perform the functions of the present disclosure.

The chassis 201 also houses the communication system 222 that is coupled to the data structure management application 202 (e.g., via a coupling between the communication system 222 and the processing system), and that may include a network interface controller (NIC), programmable Smart NIC, a wireless communication subsystem, and/or other communication subsystems known in the art. Also, while the data structure management database 204 and the data structure database 206 are illustrated as stored in the one or more storage devices that are housed in the chassis 201, one of skill in the art in possession of the present disclosure will recognize that the data structure management database 204 and/or the data structure database 206 may be stored in a storage device that is located outside the chassis 201 and that is accessible to the data structure management application 202 through a network (e.g., the network 150 of FIG. 1) via the communication system 222. As will be appreciated by one of skill in the art in possession of the present disclosure, the storage device and the communication system 222 may enable the data structure management application 202 to access the data structure management database 204 and/or the data structure database 206 without having to provide the data structure management database 204 and/or the data structure database 206 directly on the server computing device 200. However, while specific components of the server computing device 200 have been illustrated and described, one of skill in the art in possession of the present disclosure will recognize that other components may be included in the chassis 201 and utilized to perform the functionality described below, as well as conventional server computing device functionality (e.g., a providing the data structure application 132 of FIG. 1), while remaining within the scope of the present disclosure.

Figure 3:
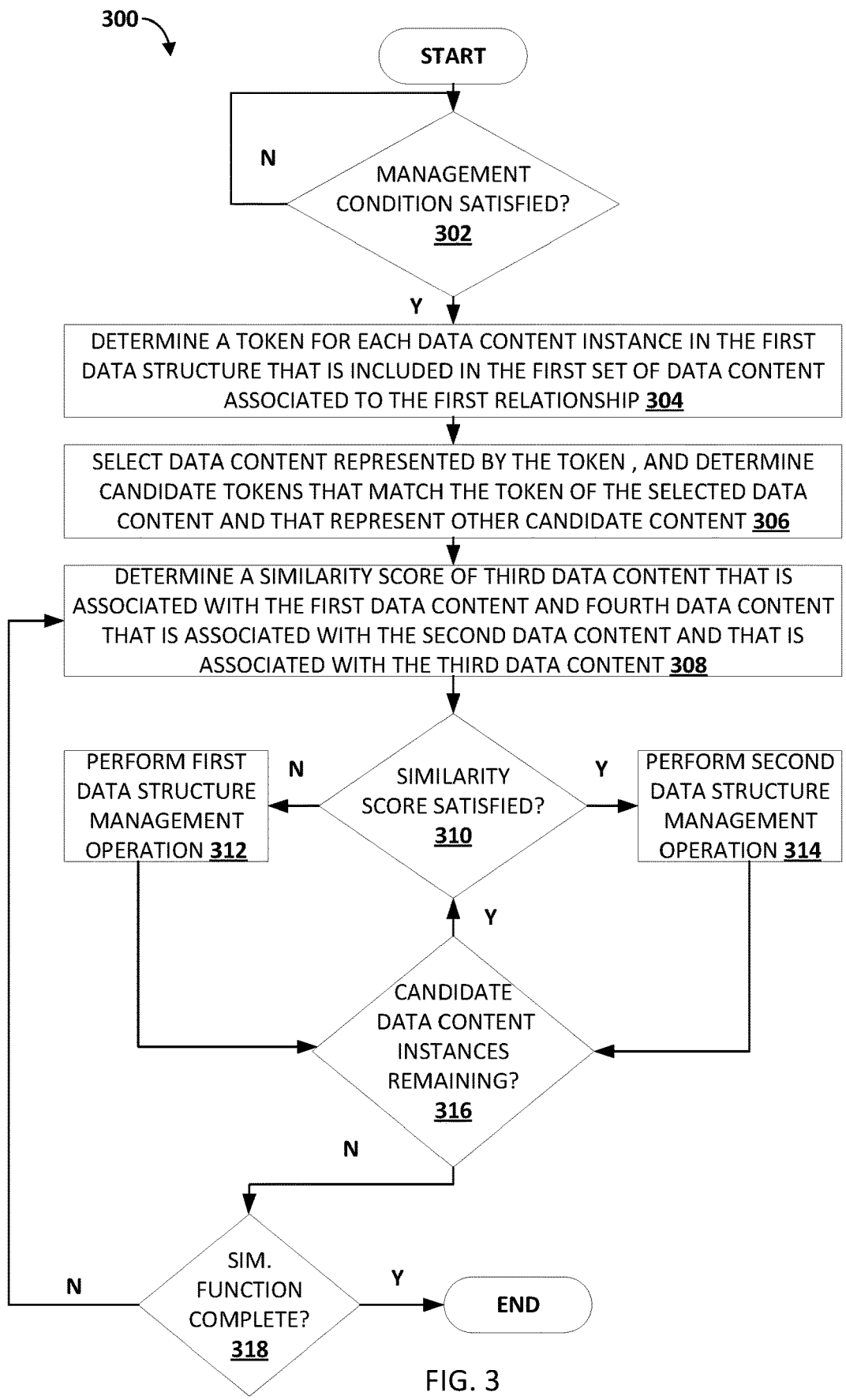
FIG. 3 is a flowchart illustrating a method of managing data structures according to an embodiment of the present disclosure.

Referring now to FIG. 3, a method 300 for managing data structures that include data content is illustrated according to an embodiment of the present disclosure. In various embodiments, the server computing device 130 may execute some or all of the elements of the method 300. However, it is contemplated that the client computing device 110 may execute some or all of the elements of the method 300 according to various embodiments. The method 300 begins at decision block 302 where it is determined whether a management condition for a first data structure that includes data content (e.g., a text content) has been satisfied. In an embodiment, at decision block 302, the data structure management application 202 included in the server computing device 200 monitors the data structures 218a-218n to determine whether the data structures 218a-218n satisfy any predetermined management conditions to determine whether the data structure management application 202 should perform any data structure management actions on the data structures 218-218n. For example, the management condition may include a predetermined time period that may have lapsed after a data structure management operation had last been performed on any particular data structure 218a-218n.

In another example, the management condition may include a predetermined number of data structures in the data structure database 206 such that once the number of data structures in the data structure database 206 has grown to the predetermined number of data structures, the management condition will be satisfied. In other examples, the data structure management application 202 may monitor for a management condition that is based on a predetermined storage requirement of a particular data structure and/or the storage requirement of the data structures 218a-218n. While specific examples of management conditions are discussed, one of skill in the art in possession of the present disclosure will recognize that any other management condition or combination of management conditions may fall under the scope of the present disclosure. If at decision block 302 the data object does not satisfy a management condition, the data structure management application 202 may continue to monitor each of the data structures 218a-218n until one of the data structures 218a-220n and/or any of the components of the networked system 100 satisfy the management condition.

Alternatively, if at decision block 302 the management condition is satisfied, the method 300 may then proceed to block 304 where a token for data content included in a data structure is determined based on a frequency that data values included in the data content is found in a corpus set of data values provided in a data structure dictionary. In an embodiment, at block 304, the data structure management application 202 may determine a token for data content included in a data structure. Specifically, each data structure may include a plurality of data content instances and each data content instance may include one or more data values (e.g., text content). Furthermore, each data content instance within a first data structure may be associated with a first set of data content included in the first data structure according to a first relationship and may be associated with a second set of data content included in the second data structure according to a second relationship. However, in other embodiments, each data content instance may be associated with more than two sets of data content where each additional association is based on a respective relationship. Furthermore, in some examples, each data content instance within a second data structure may be associated with a third set of data content that is included in the second data structure according to a third relationship and associated with a fourth set of data content that is included in the second data structure according to a fourth relationship. In some instances, the third relationship is the same type of relationship as the first relationship and/or the fourth relationship is the same type of relationship as the second relationship.

In various embodiments of block 304, the data structure management application 202 may determine a token for each data content instance in the first data structure that is included in the first set of data content associated to the first relationship. In some embodiments, the first data structure may include data content instances that are associated with distinct relationships. As such, the data content selected to be tokenized may be based on the relationship that the data content is associated with. For example, each data content instance included in the data structure 218a that is associated with the first relationship may each be tokenized while other data content included in the data structure 218a and that is not associated with the first relationship is not tokenized. In addition, data content associated with the first relationship that is included in the one or more of the data structures 218b-218n may also be tokenized. In some embodiments, the data structures 218a-218n on which the data structure management operations are to be performed may be selected based on a predetermined condition or manually by a user and the tokenization may occur on only data content included in those selected data structures.

The tokenization of the data content associated with the first relationship and included in one or more of the data structures provides a token in place of the data values that make up that data content. For example, the token may be generated based on the frequency that data values within the data content instance occur in a particular set of data structures as indicated by a corpus set of data values provided by the data structure dictionary 208. Each data structure dictionary entry included in the data structure dictionary 208 may include a data value, the number data content instances that the data value appears, and a token value for that data value, and/or any other information that would be apparent to one of skill in the art in possession of the present disclosure.

In various embodiments, prior to or during block 304 of method 300, the dictionary application 202a provided by the data structure management application 202 included in the server computing device 200 may generate the data structure dictionary 208. Initially, the dictionary application 202a may generate the data structure dictionary 208 indicating how frequent that a particular data value appears in the data content associated with the first relationship, the frequency that the data value appears in a set of the data structures 218a-218n, and/or the frequency that the data value appears in third-party data structures that are unrelated to the data structures 218a-218n, and/or the frequency that the data value appears in any other data source that may be used to build the data structure dictionary 208 that would be apparent to one of skill of the art in possession of the present disclosure. The dictionary application 202a may include a Natural Language Processing (NLP) algorithm that identifies each data value and a number of occurrences each data value is used in the data content of the all of the data structures 218a-218n or a statistically representative number of the data content and/or data structures 218a-218n in the data structure database 206. The dictionary application 202a may map the number of occurrences of each data value in the data content of the data structures 218a-218n to each data value when generating the data structure dictionary 208.

In various embodiments, the dictionary application 202a may add new data values that do not exist in the data structure dictionary 208 or increase a count of an existing word in the data structure dictionary 208 when new data structures and/or data content are stored in the data structure database 206. In some embodiments, the count of a data value may be decreased in response to a data value, data content, and/or a data structure in the data structure database 206 being deleted that includes that data value. However, in some instances the count for a data value may not decrease in the data structure dictionary 208 when the data value or data content and/or data structure that includes the data value is deleted from the data structure database 206 to account for words that may be irrelevant. In some embodiments, the data structure dictionary may be adjusted based on criteria (e.g., a country, a customer type, and/or other criteria) as the value of tokens may change in the context of different segments.

After determining the number of occurrences of each data value in the corpus set of data structures, the data structure management application 202 and/or dictionary application 202a may generate a token value for each data value. In various embodiments, the more frequently used data values in the corpus set may be given a lower weight or token value than data values that are less frequently used in the corpus set. For example, a token generated for a data content instance may include a sub-token of a plurality of sub-tokens computed for each data value included in the data content that has the highest inverse document frequency and/or the token generated for the data content instance may include the data value represented by the sub-token that has the highest inverse document frequency. The highest inverse document frequency may be calculated based on the number of data value instances in the data structure dictionary for a particular data value. For example, the inverse document frequency (IDF) for each data value may be represented by the equation:

$$IDF = \log \frac{N}{n_t},$$

where N is the numoer of data content instances in the data structure database 206 and $n_t$ is the number of data content instances where the data value appears. However, in other embodiments, N may be the number of data structures in the data structure database 206 and $n_t$ is the number of data structures where the data value appears. Furthermore, while a specific IDF equation is illustrated, one of skill in the art in possession of the present disclosure will recognize that other variations of the IDF equation may be used and/or any other equation that may distinguish a frequency that a data value is used in the data structures 218a-218n from a frequency that another data value is used in the data structures 218a-218n.

Figure 4:
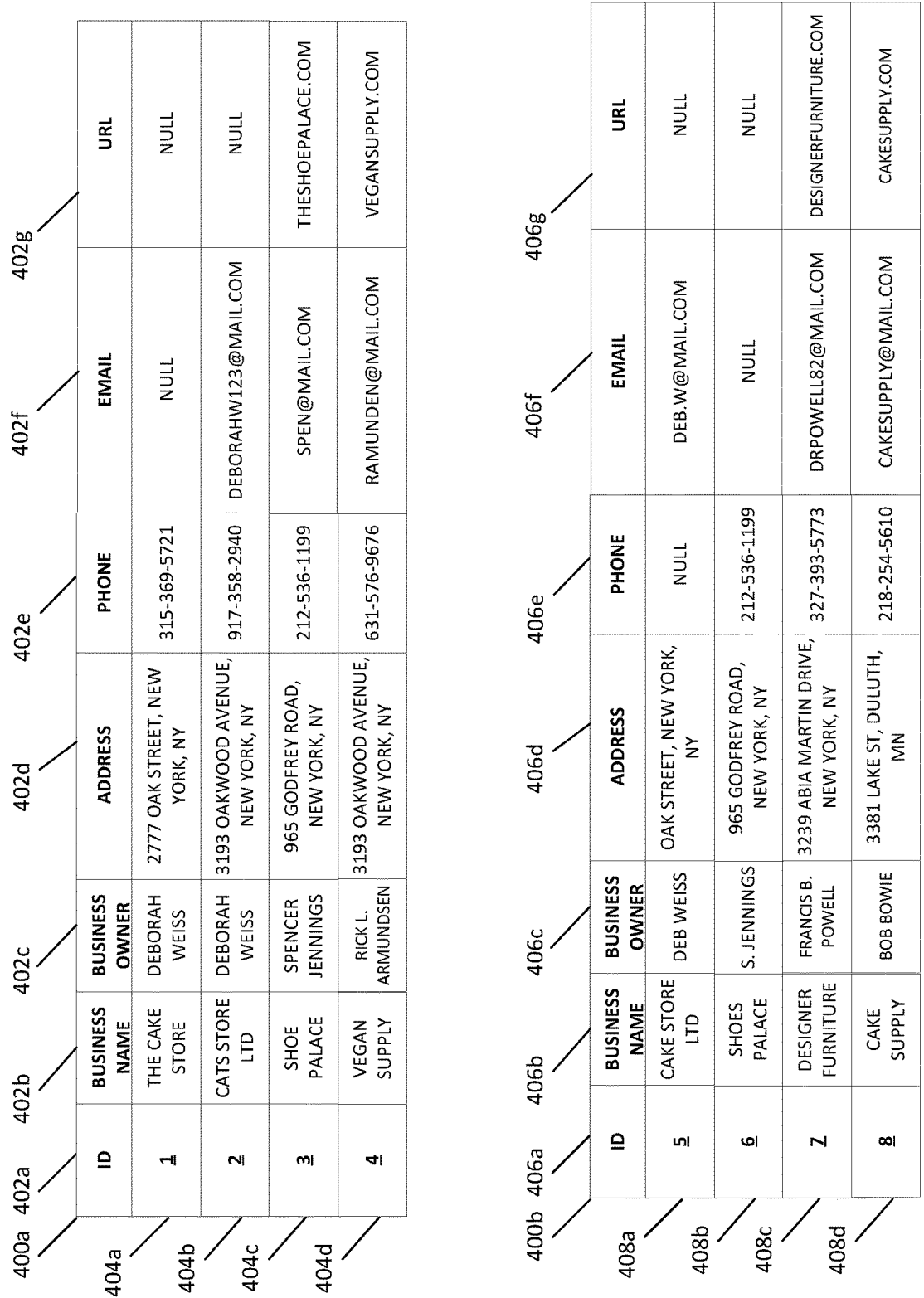
FIG. 4 illustrates two data tables that may be provided by data structures of FIG. 2 and used during the method of FIG. 3 according to an embodiment of the present disclosure.

Referring now FIG. 4, example data structures 218a and 218b of FIG. 2 are illustrated. The data structure 218a may include a data table 400a and the data structure 218b may include a data table 400b. The data table 400a may include one or more data assets 402a, 402b, 402c, 402d, 402e, 402f, and/or up to 402g (e.g., one or more data keys, one or more relationships, etc.) that represents data content (e.g., data fields/cells of the data table 400a). For example, the data asset 402a may provide the data content that is associated with an identifier relationship, the data asset 402b may provide the data content that is associated with a business name relationship, the data asset 402c may provide the data content that is associated with a business owner relationship, the data asset 402d may provide the data content that is associated with an address relationship, the data asset 402e may provide the data content that is associated with a phone number relationship, the data asset 402f may provide the data content that is associated with an email relationship, and the data asset 402g may provide the data content that is associated with a Uniform Resource Locator (URL) relationship.

The data table 400a may include one or more data records 404a, 404b, 404c, and up to 404d (e.g., one or more data keys, one or more relationships, etc.). For example, the data record 404a may provide data content that is associated with the identifier "1" relationship, the data record 404b may provide data content that is associated with the identifier "2" relationship, the data record 404c may provide data content that is associated with the identifier "3" relationship, and the data record 404d may provide data content that is associated with the identifier "4" relationship. Each data content instance may include one or more data values. For example, the data content instance associated with data record 404a and data asset 402a, may include data values (e.g., text content) "THE", "CAKE", and "STORE." While the data values are illustrated as being broken out into individual words as indicated by spaces, one of skill in the art will recognize that the data values may be identified according to other rules (e.g., word roots, syllables, prefixes, suffixes, and/or other rules that would be apparent to one skill in the art in possession of the present disclosure).

With reference to data table 400b, the data table 400b may include one or more data assets 406a, 406b, 406c, 406d, 406e, 406f, and/or up to 406g (e.g., one or more data keys, one or more relationships, etc.) that represents data content (e.g., data fields/cells of the data table 400b). For example, the data asset 406a may provide the data content that is associated with an identifier relationship, the data asset 406b may provide the data content that is associated with a business name relationship, the data asset 406c may provide the data content that is associated with a business owner relationship, the data asset 406d may provide the data content that is associated with an address relationship, the data asset 406e may provide the data content that is associated with a phone number relationship, the data asset 406f may provide the data content that is associated with an email relationship, and the data asset 406g may provide the data content that is associated with a Uniform Resource Locator (URL) relationship. While the data table 400b includes the same data assets, the same number of data assets, and the same order of data assets, one of skill in the art in possession of the present disclosure will recognize that the data table 400b may include additional data assets, fewer data assets, different data assets, and/or a different data asset order than the data assets 402a-402g of the data table 400a.

Furthermore, the data table 400b may include one or more data records 408a, 408b, 408c, and up to 408d (e.g., one or more data keys, one or more relationships, etc.). For example, the data record 408a may provide data content that is associated with the identifier "5" relationship, the data record 408b may provide data content that is associated with the identifier "6" relationship, the data record 408c may provide data content that is associated with the identifier "7" relationship, and the data record 408d may provide data content that is associated with the identifier "8" relationship. Each data content instance may include one or more data values. For example, the data field associated with data record 408a and data asset 406a, may include data values (e.g., text content) "CAKE", "STORE", and "LTD." While the data values are illustrated as being broken out into individual words as indicated by spaces, one of skill in the art will recognize that the data values may be identified according to other rules (e.g., word roots, syllables, prefixes, suffixes, and/or other rules that would be apparent to one skill in the art in possession of the present disclosure).

In various embodiments, the data structure dictionary 208 may be generated using the data values in the data table 400a and the data table 400b and/or one or more data tables included in the data structures 218c-218n of FIG. 2. For example, the dictionary application 202a may use a Natural Language Processing (NLP) algorithm to identify words, phrases, symbols, text strings, and/or other text content included in each data field. However, one of skill in the art in possession of the present disclosure will recognize that other content recognition algorithms may be used to identify particular data values within the data content instances. The dictionary application 202a may count the number of data content instances in the corpus set of data content instances and/or data structures and count the number of data content instances that include at least one instance of a data value. For example, if a data content instance is included one instance of the data value, two instances of the same data value, three instances of the same data value, and so on, then the count would be one for that data content instance.

Referring to FIG. 5, an example data structure dictionary 500 is illustrated that may include the data structure dictionary 208 of FIG. 2. The data structure dictionary 500 may include a data value column 502a, a number of occurrences column 502b, and a token value column 502c. The data structure dictionary 500 may include a row (e.g., rows 504a, 504b, 504c, 504d, 504e, 504f, 504g, 504h, 504i, 504j, 504k, 504l, and up to 504n) for each unique data value (e.g., word) in the data content included in the data structures 218a-218n. For example, the row 504a may include "THE" as an entry in the data value column 502a, which has been used in the data content of the data structures 218a-218n "50,000" times as indicated in the number of occurrences column 502b. If the total number of data content instances is "100,000" and using the IDF equation above, "THE" is assigned a token value of "0.301" in the token value column 502c. The row 504b may include "CAKE" as an entry in the data value column 502a, which has been used in the data content of the data structures 218a-218n "25" times as indicated in the number of occurrences column 502b. If the total number of data content instances is "100,000" and using the IDF equation above, "CAKE" is assigned a token value of "3.602" in the token value column 502c. The row 504c may include "STORE" as an entry in the data value column 502a, which has been used in the data content of the data structures 218a-218n "2000" times as indicated in the number of occurrences column 502b. If the total number of data content instances is "100,000" and using the IDF equation above, "STORE" is assigned a token value of "1.699" in the token value column 502c.

The row 504d may include "CATS" as an entry in the data value column 502a, which has been used in the data content of the data structures 218a-218n "100" times as indicated in the number of occurrences column 502b. If the total number of data content instances is "100,000" and using the IDF equation above, "CATS" is assigned a token value of "3" in the token value column 502c. The row 504e may include "LTD" as an entry in the data value column 502a, which has been used in the data content of the data structures 218a-218n "2500" times as indicated in the number of occurrences column 502b. If the total number of data content instances is "100,000" and using the IDF equation above, "LTD" is assigned a token value of "1.602" in the token value column 502c. The row 504f may include "SHOE" as an entry in the data value column 502a, which has been used in the data content of the data structures 218a-218n "500" times as indicated in the number of occurrences column 502b. If the total number of data content instances is "100,000" and using the IDF equation above, "SHOE" is assigned a token value of "2.301" in the token value column 502c. The row 504g may include "PALACE" as an entry in the data value column 502a, which has been used in the data content of the data structures 218a-218n "15" times as indicated in the number of occurrences column 502b. If the total number of data content instances is "100,000" and using the IDF equation above, "PALACE" is assigned a token value of "3.824" in the token value column 502c. The row 504h may include "VEGAN" as an entry in the data value column 502a, which has been used in the data content of the data structures 218a-218n "30" times as indicated in the number of occurrences column 502b. If the total number of data content instances is "100,000" and using the IDF equation above, "VEGAN" is assigned a token value of "3.523" in the token value column 502c.

The row 504i may include "SUPPLY" as an entry in the data value column 502a, which has been used in the data content of the data structures 218a-218n "125" times as indicated in the number of occurrences column 502b. If the total number of data content instances is "100,000" and using the IDF equation above, "SUPPLY" is assigned a token value of "2.903" in the token value column 502c. The row 504j may include "SHOES" as an entry in the data value column 502a, which has been used in the data content of the data structures 218a-218n "130" times as indicated in the number of occurrences column 502b. If the total number of data content instances is "100,000" and using the IDF equation above, "SHOES" is assigned a token value of "2.886" in the token value column 502c. The row 504k may include "DESIGNER" as an entry in the data value column 502a, which has been used in the data content of the data structures 218a-218n "228" times as indicated in the number of occurrences column 502b. If the total number of data content instances is "100,000" and using the IDF equation above, "DESIGNER" is assigned a token value of "2.642" in the token value column 502c. The row 504l may include "FURNITURE" as an entry in the data value column 502a, which has been used in the data content of the data structures 218a-218n "500" times as indicated in the number of occurrences column 502b. If the total number of data content instances is "100,000" and using the IDF equation above, "FURNITURE" is assigned a token value of "2.301" in the token value column 502c.

Figure 6:
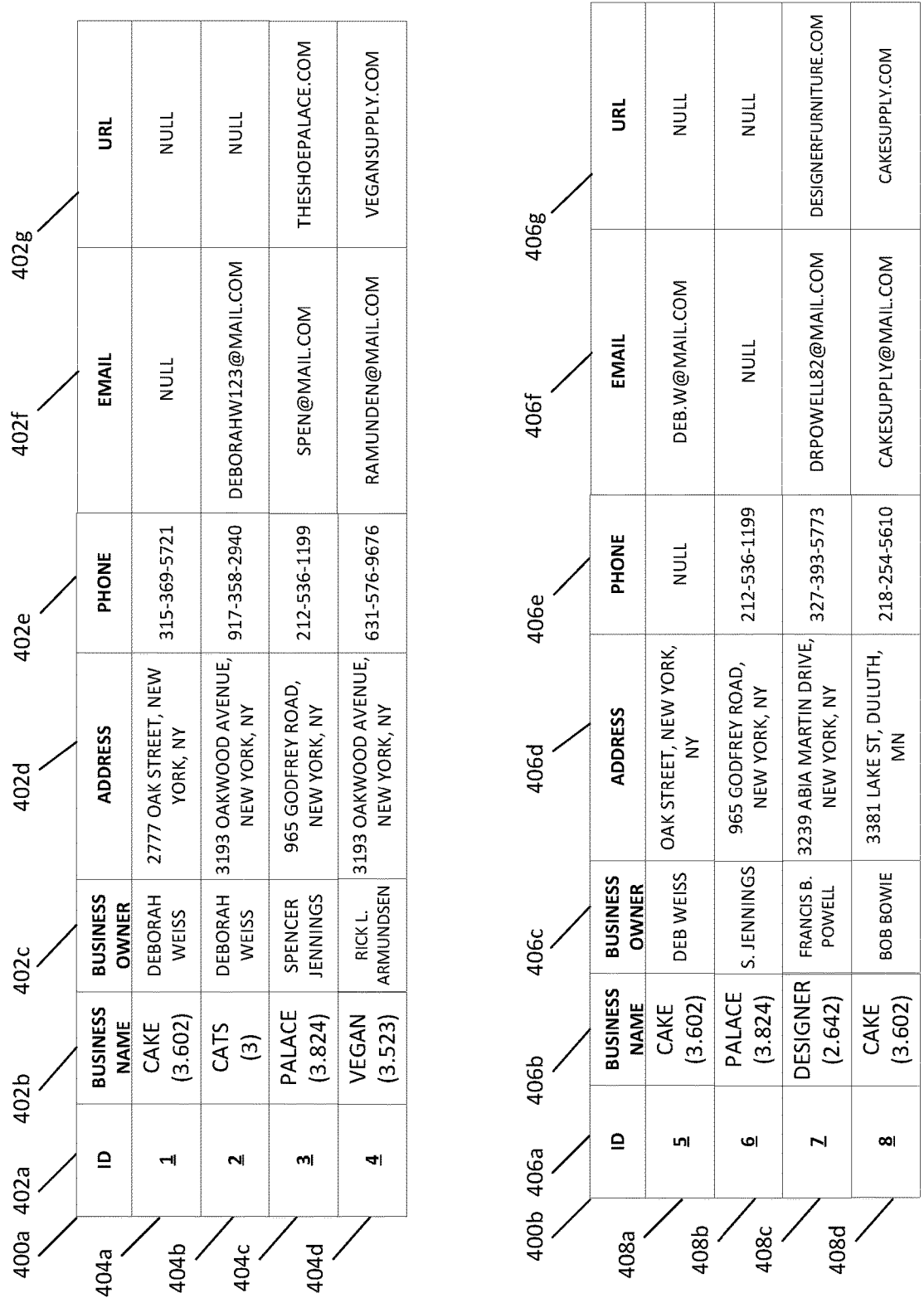
FIGS. 6-9 illustrate the two data tables of FIG. 4 during the method of FIG. 3 according to an embodiment of the present disclosure.

Referring now to FIG. 6, the data tables 400a and 400b of FIG. 4 are illustrated where each data content instance that is associated with a first relationship is represented as a token. For example, the first relationship "Business Names" that is associated with data content to be tokenized is selected by the data structure management application 202 from the data asset 402b of data table 400a and/or the data asset 406b of data table 400b. The data structure management application 202 may determine which of the data values within a particular data content instance (e.g., data field) has the greatest token value. For example, because the data value "CAKE" in the data content instance defined by data asset 402b and data record 404a has a token value of "3.602", the data value "STORE" has a token value of "1.699", and the data value "THE" has a token value of "0.301", then the token that is selected to represent the data content of "THE CAKE STORE" is the token value "3.602" and/or "CAKE" because the token value "3.602" is the greatest token value of the token values for the data values included in that data content. This indicates that the data value "CAKE" is the least frequently used data value in the data content in that particular data content. Similarly, the data content of all the other data content associated with the relationship "BUSINESS NAME" is tokenized to a token value and/or data value represented by the token value calculated for the least used term in the corpus of data content and/or data structures. As such, for each data content instance in the data asset 402b and the data asset 406b may be represented by the token value and/or the data value represented by the token value. For example, "THE CAKE STORE" is represented as a token "CAKE" and/or "3.602".

Referring back to FIG. 3, the method 300 then proceeds to block 306 where data content represented by the token is selected, and candidate tokens that match the token and that represent other data content are determined. In an embodiment, at block 306, the data structure management application 202 may use the matching algorithm 202b to compare each of the tokens that represent each data content that is associated with a first relationship to each other to determine whether any of the token values and/or the data values represented by the token values match each other. If the tokens match each other (e.g., the token values match each other and/or if the data values represented by the tokens match each other), then those tokens may be considered candidate tokens (e.g., candidate data content) of each other. In various embodiments, the matching algorithm 202b may include a strict match algorithm that requires that the tokens be identical to each other or within a predetermined threshold of error. It is noted that during the matching of tokens of various data content instance of block 306, by comparing the token values alone, more false positives during performance of the strict match algorithm may occur as some different data values may have the same number of occurrences which would result in the same token value. While, as discussed below, the similarity score algorithm should identify these false positives, there would be a greater computational cost. Thus, the data content for each data content instance may be represented by the data value represented by the token value and those data values may be matched according to the matching algorithm 202b.

Figure 7:
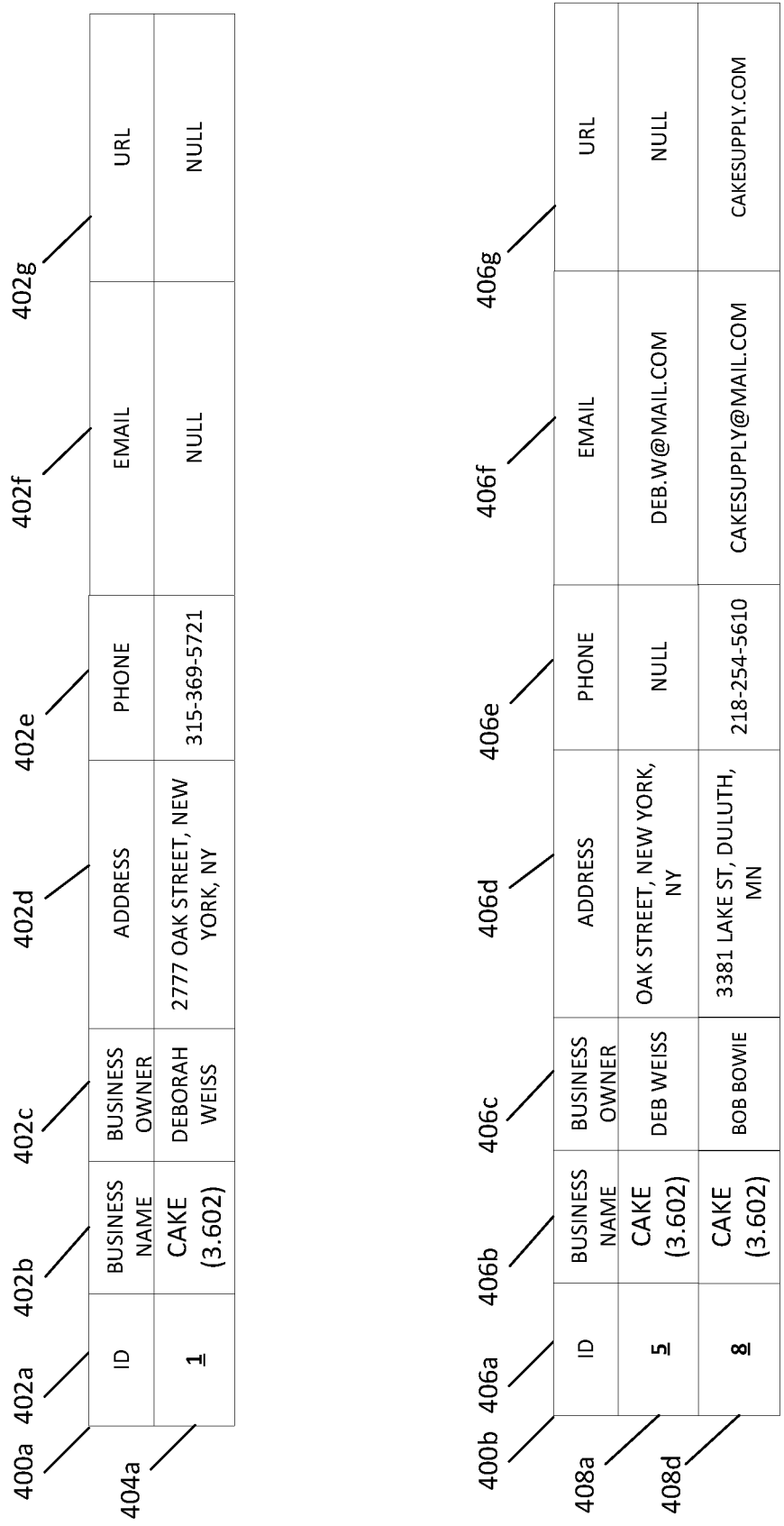

Continuing with the example above and with reference to FIG. 7, the data structure management application may select the token value represented by data asset 402b and data record 404a of FIG. 6. The data structure management application 202 may then search for all of the data content associated with the first relationship (e.g., "BUSINESS NAME") that is equal to or within a predetermined threshold of token value "3.602" and/or the data value "CAKE" that represents the data content "THE CAKE STORE" associated with data asset 402b (e.g., the first relationship) and data record 404a (e.g., the second relationship). Because the data content associated with the data asset 406b and the data record 408a has a token value of "3.602" and/or the data value "CAKE" that represents the data content "CAKE STORE LTD" and the data content associated with the data asset 406b and the data record 408d has a token value of "3.602" and/or the data value "CAKE" that represents the data content "CAKE SUPPLY", the data structure management application 202 may designate those tokens values and/or data values and the underlying data content as candidate tokens and candidate data content. The data structure management application 202 may ignore the remaining data content in that data asset 402b and any other data content that those data content instances that are candidates is not associated with. However, other data content that is associated with the data content and candidate data content based on any other relationship may remain (e.g., data content associated with the second relationship (e.g., all of the data content associated with the data records 404a, 408a, and 408d)).

While block 306 may be performed by matching a token (e.g., a token value and/or a data value represented by the token value) of a single data content instance included a first data record (e.g., the second relationship discussed above) to another token of another data content instance included in a second data record (e.g., the fourth relationship discussed above), the systems and methods herein could generate tokens for multiple data content instances that are included in the data records and performing the matching algorithm on those data content instances as well when determining candidate data records for a data record. Furthermore, multiple token values and/or data values represented by the token values may be used within a particular data content instance. For example, if a second token value of a data content instance is higher than a token value threshold, that token value and/or the data value represented by the token value may also be considered when matching the token of a data content instance to tokens of other data content instances.

Referring back to FIG. 3, the method 300 may proceed to block 308 where a similarity score of third data content that is associated with the first data content and fourth data content that is associated with the second data content and that is associated with the third data content is determined. In an embodiment, at block 308, the data structure management application 202 using the similarity score algorithm 202c may determine a similarity score between any other data content that is associated with the candidate token where that other data content is associated with each other. For example, the similarity score algorithm 202c may include a fuzzy function (e.g., a Jaro-Winkler function, a Hamming distance function, a Levenshtein distance function, and/or any other fuzzy function that may be apparent to one of skill in the art in possession of the present disclosure). While determining a similarity score between data content instances is described as determining a single similarity score, multiple data content instances in a relationship with the tokenized data content instance may be compared to content instances in a relationship with the candidate tokenized data content instance to determine similarity.

Figure 8:
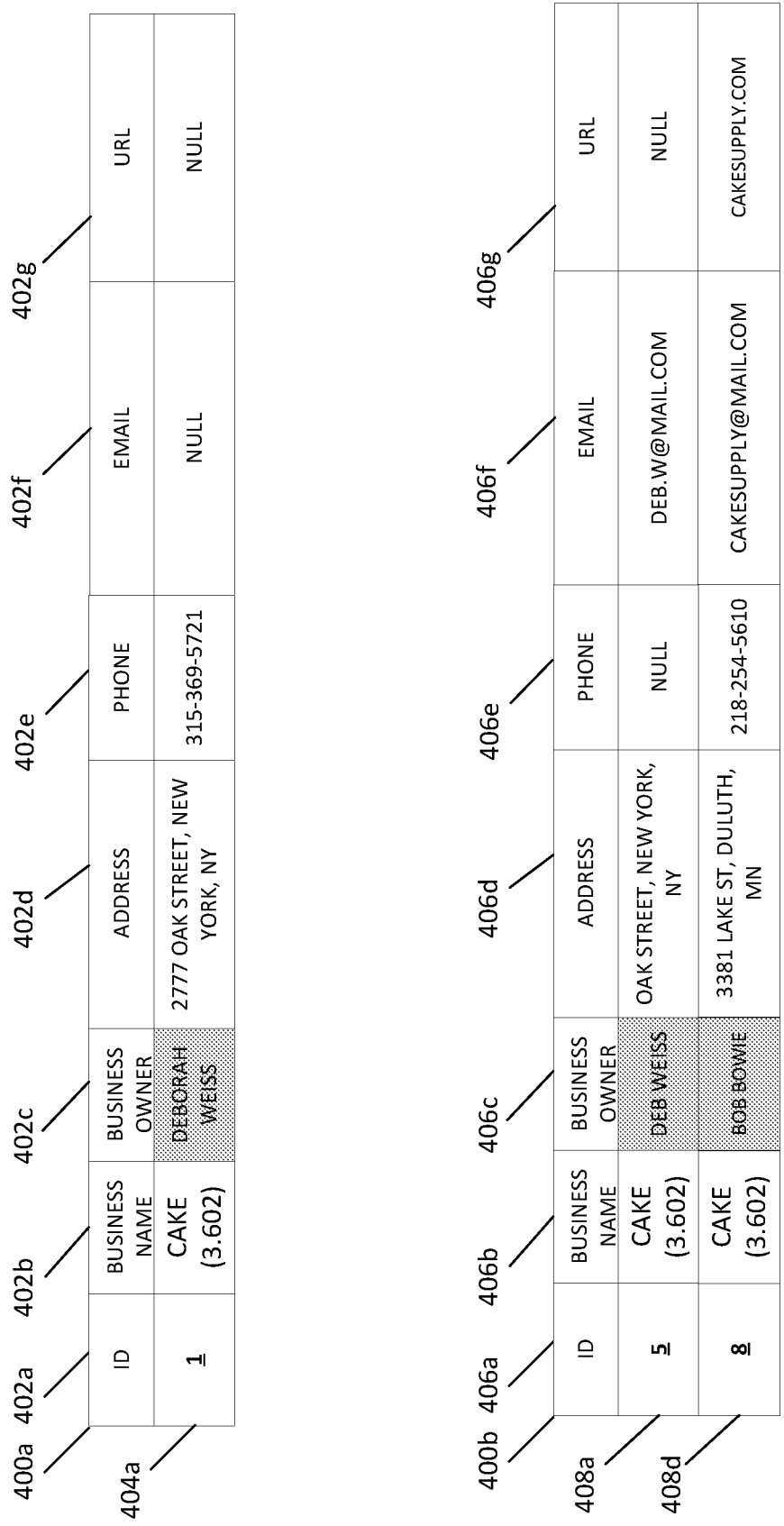

In a specific example, and referring to FIG. 8, the data structure management application 202 may use the data content that is associated with the data asset 402c and each of the data records 404a, 408a, and 408d to determine a similarity score using the similarity score algorithm 202c. As can be seen from FIG. 8, the data content "DEBORAH WEISS" and "DEB WEISS" may result in a relatively high similarity score indicating high similarity when compared to a similarity score generated for the data content "DEBORAH WEISS" and "BOB BOWIE" or a similarity score generated for the data content "DEB WEISS" and "BOB BOWIE", which may indicate low similarity.

Referring back to FIG. 3, the method 300 may proceed to decision block 310 where it is determined whether a similarity score satisfies a similarity condition. In an embodiment, at decision block 310, the data structure management application 202 may determine whether the similarity score associated with candidate tokens/content data satisfies a similarity condition (e.g., a predetermined similarity threshold). For example, a similarity score generated may be compared to a predetermined similarity score threshold and if the similarity score is greater than or equal to that predetermined similarity score threshold, then the similarity condition is satisfied. However, if the similarity score is less than the predetermine similarity score threshold, then the similarity condition is not satisfied. In various embodiments, the similarity condition may be a function of the token value. For example, tokens with higher token values may require a lower similarity score threshold while tokens with lower token values (e.g., less unique data values) may require a higher similarity score threshold.

If at decision block 310, the similarity score does not satisfy the similarity condition, then the method 300 may proceed to block 312 where a first data structure management operation is performed on data content associated with the second relationship or the data content associated with the fourth relationship. In an embodiment, at block 312, the data structure management application 202, in response to determining that a similarity condition is not satisfied by the similarity score, may ignore the data content that is candidate data content to the other data content. As such, the data structure management application 202 may determine that there is no match between the candidate data content and the selected data content, and any data content associated with that candidate data content may be removed from the candidate set. If the data structure management operations are operating to combine data structures, the data content instance and its associated data content according to a relationship may be moved from one data structure to another data structure as the candidate data content may be unique from the selected data content and from other data content in the data structure as discussed below in FIGS. 9 and 10. However, one of skill in the art in possession of the present disclosure will recognize that other data structure management operations may be performed on the data content while still falling under the scope of the present disclosure.

If at decision block 310, the similarity score satisfies the similarity condition, then the method 300 may proceed to block 314 where a second data structure management operation is performed on data content associated with the second relationship or the data content associated with the fourth relationship. In an embodiment at block 314, the data structure management application 202, in response to determining that a similarity condition is satisfied by the similarity score, may determine the data content instances match. As such, the data structure management application 202 may merge the data content of the selected data content instance and any data content that is associated with the selected data content instance according to the second relationship with the candidate data content instance and any data content that is associated with the candidate data content instance according to the fourth relationship. The matching essentially shows that the second relationship and the fourth relationship are the same. The merging of the data content may include removing redundant data values, combining data values that have variations to provide alternate data values, adding data content that is not present in one of the relationships, and/or other data structure merging operations that would be apparent to one of skill in the art in possession of the present disclosure. While specific data structure management operations are discussed herein, one of skill in the art in possession of the present disclosure will recognize that other data structure management operations may be performed on the data content while still falling under the scope of the present disclosure. For example, the data structure management operation may include deleting one of the data content instances that match from a data structure and any data content associated with it according to the fourth relationship.

The method 300 may proceed from block 312 or block 314 to decision block 316 where it is determined whether any candidate data content instances are remaining. If there are candidate data instances remaining, the method 300 may proceed to decision block 310 to determine whether the next candidate data instance satisfies the similarity score with the selected data content instance. If, at decision block 316, there are no more candidate data instances for the selected data content instance, then the method 300 may proceed to decision block 318 where it is determined whether the similarity function has been performed on all token included in the data structures 218a-218n that are associated with the first relationship. If the data structure management application 202 determines that the similarity scoring operation has been completed for all token, the method 300 may end and the data structure management operation is completed. However, if the data structure management application 202 determines that the similarity operations have not been completed, then the method proceeds to block 306 where another token associated with another data content instance is selected to determine whether there are candidate data content instances associated with that token.

Figure 9:
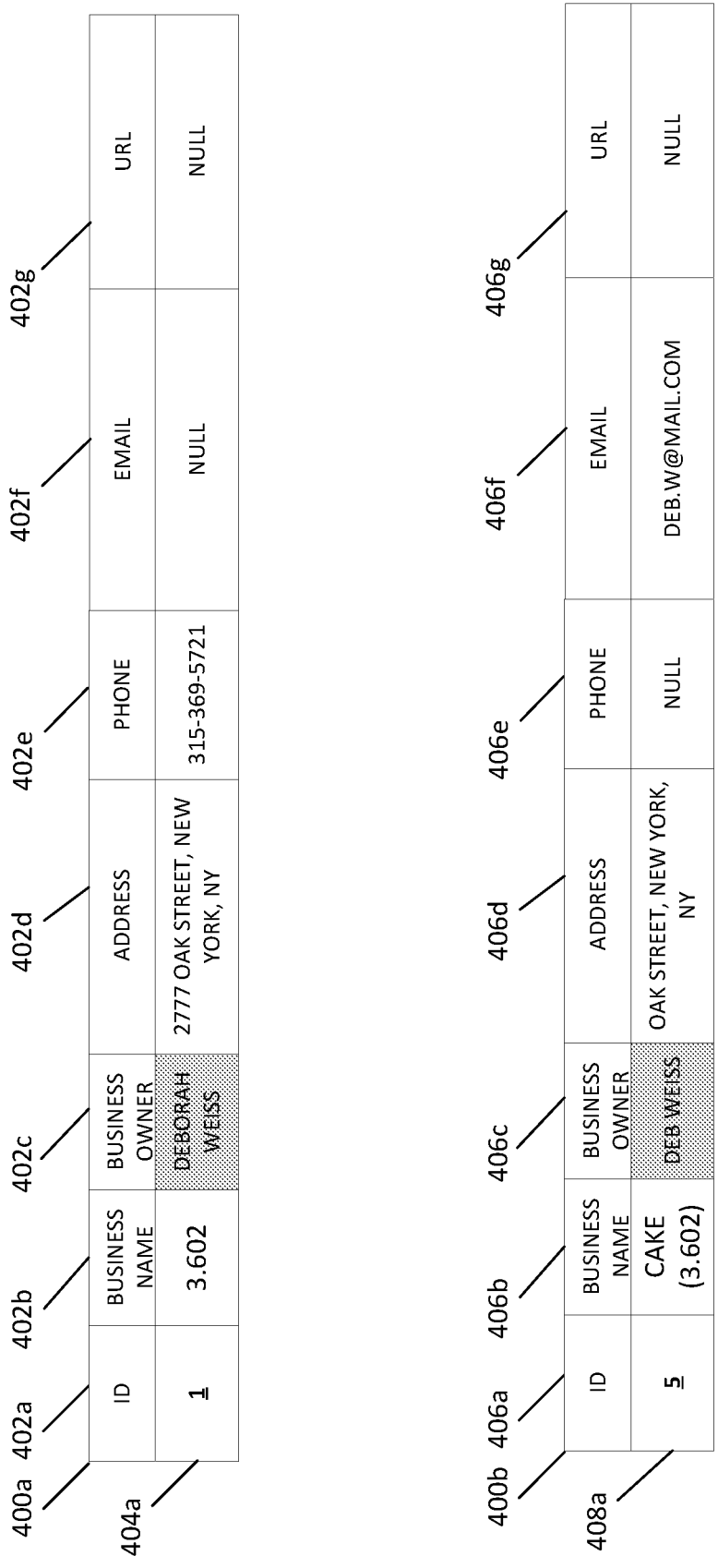

Referring now to FIGS. 9 and 10, the data structure management application 202 may determine that the similarity score for data content "DEBORAH WEISS" and "DEB WEISS" satisfies the similarity condition with respect to decision block 310 of FIG. 3 while the similarity score for the data content "DEBORAH WEISS" and "BOB BOWIE" do not satisfy the similarity condition with respect to decision block 310 of FIG. 3. In the illustrated example, the data structure management application 202 is merging the data table 400a and the data table 400b together. As such, the data structure management application 202 may remove the data record 408d that includes the data content "BOB BOWIE" from the list of candidate data records that match the data record 404a, according to block 312 of FIG. 3. The method 300 may proceed to decision block 316 and then to decision block 310 because the data structure management application 202 needs to process a similarity score of "DEBORAH WEISS" and "DEB WEISS." The similarity score for this data content pairing may be satisfied in decision block 310 and the method 300 proceeds from decision block 310 to block 314 where a different data structure management operation is performed. In various embodiments, the data structure management application 202 may then add the data record 408d to the data table 400a and remove the data record 408d from the data table 400b as illustrated in FIG. 10. Because the similarity score for the data content "DEBORAH WEISS" and "DEB WEISS" satisfies the similarity condition, the data structure management application 202 may retain the data record 408a as a candidate for data record 404a as illustrated in FIG. 9. Subsequently, the data structure management application 202 may merge data record 408a and data record 404a as the match indicates that the data content associated with "DEBORAH WEISS" and the data content associated with "DEB WEISS" is associated based on the same relationship (e.g., same business entity).

As illustrated in FIG. 10, data content from data record 408a may be added to data record 404a (e.g., email "DEB.W@MAIL.COM" may be added). In other examples, redundant data values may be removed. For example, "OAK STREET, NEW YORK, N.Y." may be discarded from data record 408a and not included as data record 404a already includes "OAK STREET, NEW YORK, N.Y.". If there is variation in the data values that correspond, then multiple instances of those data values that have the variation may be present (e.g., "THE CAKE STORE" and "CAKE STORE LTD"). However, one of skilled in the art in possession of the present disclosure will recognize that the data content and their corresponding data values may be merged in various ways while still falling under the scope of the present disclosure. As illustrated in FIG. 10, the method 300 may have iterated through the data records 404a-404d and the data records 408a-408d (e.g., via decision block 318 of FIG. 3), which resulted in the merging of data records 404a and 408a as a data record 1002a as well as the merging of the data records 404c and 408c as a data record 1002b resulting in the data records 408b and 408d being removed from the data table 400b and added to the data table 400a. Furthermore, the data records 408b and 408d may be added as new data records to the data table 400a. As a result, the entire data table 400b (e.g., the data structure 218b) may be removed from the data structure database 206.

Thus, the systems and methods of the present disclosure extend the hybrid strict matching and similarity matching technique that enables the high coverage of similarity matching without compromising the computational performance of strict match. This includes determining potential merging candidates by applying a first filtering layer based on the strict matching a token for data values include in a data content instance based on the frequency that the data values are used in a corpus set of data content instances. The token for the data content instance may be the sub-token for that least used data value within the data content instance and thus a unique or rare term that can be used to identify other potential matches using a matching algorithm, which generates a set of potential candidate data content instances. Other data content instances associated with the potential candidates of data content instances may then be used to perform the similarity matching based on a similarity score. If the similarity score satisfies a similarity score condition, then that indicates that the selected data content instance and the candidate content instances are the same, even if there are slight variations/noise in the data values of each data content instance. As such, systems and methods of the present disclosure allows us to keep the candidate population relatively small (and therefore computationally feasible) and yet with high coverage when performing data structure management operations.

Figure 11:
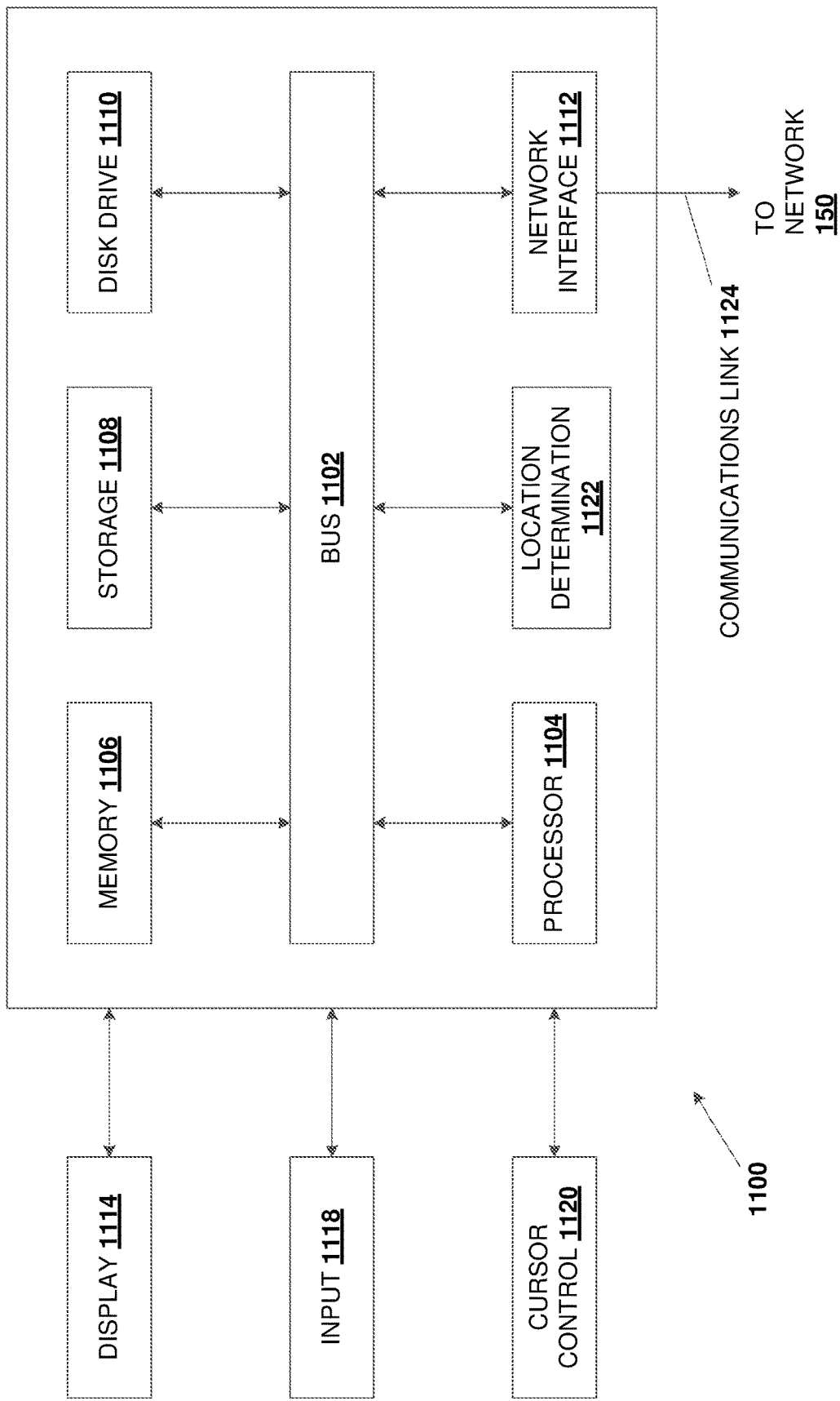
FIG. 11 is a block diagram of an example computer system according to various aspects of the present disclosure.

FIG. 11 is a block diagram of a computer system 1100 suitable for implementing one or more embodiments of the present disclosure, including the server computing device 130 and the client computing device 110. In various implementations, the client computing device 110 may include a mobile cellular phone, personal computer (PC), laptop, wearable computing device, etc. adapted for wireless communication, and the server computing device 130 may include a network computing device, such as a server. Thus, it should be appreciated that the computing devices 110 and 130 may be implemented as the computer system 1100 in a manner as follows.

In accordance with various embodiments of the present disclosure, computer system 1100, such as a computer and/or a network server, includes a bus 1102 or other communication mechanism for communicating information, which interconnects subsystems and components, such as a processor 1104 (e.g., processor, micro-controller, digital signal processor (DSP), etc.), a system memory component 1106 (e.g., RAM), a static storage component 1108 (e.g., ROM), a disk drive component 1110 (e.g., magnetic or optical), a network interface component 1112 (e.g., modem or Ethernet card), a display component 1114 (e.g., CRT or LCD), an input component 1118 (e.g., keyboard, keypad, or virtual keyboard), a cursor control component 1120 (e.g., mouse, pointer, or trackball), and/or a location determination component 1122 (e.g., a Global Positioning System (GPS) device as illustrated, a cell tower triangulation device, and/or a variety of other location determination devices known in the art.) In one implementation, the disk drive component 1110 may comprise a database having one or more disk drive components.

In accordance with embodiments of the present disclosure, the computer system 1100 performs specific operations by the processor 1104 executing one or more sequences of instructions contained in the memory component 1106, such as described herein with respect to the computing devices and anomaly detection server, and/or any other device. Such instructions may be read into the system memory component 1106 from another computer readable medium, such as the static storage component 1108 or the disk drive component 1110. In other embodiments, hard-wired circuitry may be used in place of or in combination with software instructions to implement the present disclosure.

Logic may be encoded in a computer readable medium, which may refer to any medium that participates in providing instructions to the processor 1104 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 1110, volatile media includes dynamic memory, such as the system memory component 1106, and transmission media includes coaxial cables, copper wire, and fiber optics, including wires that comprise the bus 1102. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 1100. In various other embodiments of the present disclosure, a plurality of the computer systems 1100 coupled by a communication link 1124 to the network 150 (e.g., such as a LAN, WLAN, PTSN, and/or various other wired or wireless networks, including telecommunications, mobile, and cellular phone networks) may perform instruction sequences to practice the present disclosure in coordination with one another.

The computer system 1100 may transmit and receive messages, data, information and instructions, including one or more programs (i.e., application code) through the communication link 1124 and the network interface component 1112. The network interface component 1112 may include an antenna, either separate or integrated, to enable transmission and reception via the communication link 1124. Received program code may be executed by processor 1104 as received and/or stored in disk drive component 1110 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a computing device, a server device, other devices described herein.

What is claimed is:

1. A system, comprising:
a non-transitory memory storing instructions; and
one or more hardware processors coupled to the non-transitory memory and configured to read the instructions from the non-transitory memory to cause the system to perform operations comprising:
generating a first token for a first data content instance in a first data record having a first plurality of data content instances, wherein the first token is generated based on a first frequency that data values included in the first data content instance are found in a corpus set of data values provided in a data structure dictionary;

generating a second token for a second data content instance in a second data record having a second plurality of data content instances, wherein the second token is generated based on a second frequency that data values included in the second data content instance are found in the corpus set of data values provided in the data structure dictionary, wherein the first data content instance and the second data content instance are a first type of data content;

determining the second token matches the first token within a predetermined threshold;

calculating, in response to the second token matching the first token, a first similarity score of one or more data values from a third data content instance included in the first data record with one or more data values from a fourth data content instance included in the second data record, wherein the third data content instance and the fourth data content instance are of a second type of data content;

determining that the first similarity score satisfies a similarity threshold; and performing, in response to the first similarity score satisfying the similarity threshold, a first modification to at least one of at least a portion of data content included in the first data record or at least a portion of data content included in the second data record, wherein the performing the first modification includes merging at least a portion of data content included in the second data record with at least a portion of data content included in the first data record.

2. The system of claim 1, wherein the performing the first modification includes removing any merged data values from the second data record.

3. The system of claim 1, wherein the operations further comprise:
determining the similarity threshold based on a value of the first token.

4. The system of claim 1, wherein the first similarity score includes a fuzzy function score calculated using a fuzzy function.

5. The system of claim 1, wherein the operations further comprise:
generating a third token for a fifth data content instance in a third data record having a third plurality of data content instances, wherein the third token is generated based on a third frequency that data values included in the fifth data content instance is found in the corpus set of data values provided in the data structure dictionary, wherein fifth data content instance is the first type of data content;

determining the third token matches the first token within a predetermined threshold;

calculating a second similarity score of the one or more data values from the third data instance included in the first data record with one or more data values from a sixth data instance included in the third data record, wherein sixth data instance is of the second type of data content;

determining that the second similarity score does not satisfy the similarity threshold; and performing, in response to the second similarity score not satisfying the similarity threshold, a second modification to at least one of at least a portion of data content included in the first data record or at least a portion of data content included in the third data record.

6. The system of claim 1, wherein the corpus set of data values provided in the data structure dictionary includes at least data values from the first data content instance, data values from the second data content instance, and data values from data content instances of the first type of data content included in a plurality of data records.

7. The system of claim 1, wherein the first token and the second token are each a sub-token computed for each data value in the data content instances that has the highest inverse document frequency.

8. A method, comprising:
generating, by a computing device, a first token for a first data content instance that is associated with a first relationship and a second relationship, wherein the first token is generated based on a first frequency that data values included in the first data content instance is found in a corpus set of data values provided in a data structure dictionary;

generating, by the computing device, a second token for a second data content instance that is associated with the first relationship and a third relationship, wherein the second token is generated based on a second frequency that data values included in the second data content instance is found in the corpus set of data values provided in the data structure dictionary;

calculating, by the computing device and in response to the second token matching the first token within a predetermined threshold, a first similarity score of one or more data values from a third data content instance that is associated with the second relationship and a fourth relationship with one or more data values from a fourth data content instance that is associated with the third relationship and the fourth relationship;

determining, by the computing device, that the first similarity score satisfies a similarity threshold such that the second relationship is the same as the third relationship; and performing, by the computing device in response to the first similarity score satisfying the similarity threshold, a first modification to at least one of at least a portion of data content instances associated with the second relationship or at least a portion of data content instances associated with the third relationship, wherein the performing the first modification includes merging the at least the portion of the data content instances associated with the third relationship with the at least the portion of the data content instances associated with the second relationship.

9. The method of claim 8, wherein the performing the first modification includes removing the at least the portion of the data content instances associated with the third relationship from a data structure.

10. The method of claim 8, wherein the first similarity score includes a fuzzy function score calculated using a fuzzy function.

11. The method of claim 8, further comprising:
generating, by the computing device, a third token for a fifth data content instance that is associated with the first relationship and a fifth relationship, wherein the third token is generated based on a third frequency that data values included in the third data content instance is found in the corpus set of data values provided in the data structure dictionary;

determining, by the computing device, the third token matches the first token within the predetermined threshold;

calculating, by the computing device, a second similarity score of the one or more data values from the third data instance with one or more data values from a sixth data instance associated the fourth relationship and the fifth relationship;

determining, by the computing device, that the second similarity score does not satisfy the similarity threshold; and performing, by the computing device in response to the first similarity score satisfying the similarity threshold, a second modification to at least one of the at least the portion of the data content instances associated with the second relationship or at least a portion of any data content instances associated with the fifth relationship.

12. The method of claim 8, wherein the first token is a sub-token computed for each data value in the first data content instance that has the highest inverse document frequency of those sub-tokens in the first data content instance, and the second token is a sub-token computed for each data value in the second data content instance that has the highest inverse document frequency of those sub-tokens in the second data content instance.

13. A non-transitory machine-readable medium having stored thereon machine-readable instructions executable to cause a machine to perform operations comprising:

generating, by a computing device, a token for each data content instance included in a first data asset that includes a first set of data content instances based on a frequency that one or more data values included in that data content instance is used in a corpus set of data values provided in a data structure dictionary, wherein each data content instance is included in a respective data record;

selecting a first data record that includes a first data content instance in the first data asset that provides a first token;

determining, from the tokens for each data content instance of the remaining data content instances in the first data asset, candidate tokens that match the first token within a predetermined threshold;

calculating, based on a first candidate token, a first similarity score of:
  one or more data values from a data content instance that is included in a second data asset that includes a second set of data content instances and that is included in the first data record that includes the first data content instance from which the first token was generated, and
  one or more data values from a data content instance that is included in the second data asset and that is included in a second data record that includes the data content instance from which the first candidate token was generated;

determining that the first similarity score satisfies a similarity threshold; and performing, in response to the first similarity score satisfying the similarity threshold, a first modification to at least one of at least a portion of data content instances included in the first data record or at least a portion of data content instances included in the second data record, wherein the performing the first modification includes merging data content instances of the second data record with data content instances of the first data record.

14. The non-transitory machine-readable medium of claim 13, wherein the performing the first modification includes deleting the second data record.

15. The non-transitory machine-readable medium of claim 13, wherein the operations further comprise:

calculating, based on a second candidate token, a second similarity score of:
  one or more data values from the data content instance that is included in the second data asset and that is included in the first data record that includes the first data content instance from which the first token was generated, and
  one or more data values from a data content instance that is included in the second data asset and that is included in a third data record that includes the data content instance from which the second candidate token was generated;

determining that the second similarity score does not satisfy the similarity threshold; and performing, in response to the first similarity score satisfying the similarity threshold, a second modification to at least one of at least a portion of data content instances included in the first data record or at least a portion of data content instances included in the third data record.

16. The non-transitory machine-readable medium of claim 13, wherein the operations further comprise:

selecting a third data record that includes a second data content instance of the first data asset that provides a second token;

determining, from the tokens for each data content instance in the first data asset but not including the tokens for the data content instances included in the first data record, the second data record, and the third data record, candidate tokens that match the second token;

calculating, based on a second candidate token, a second similarity score of
  one or more data values from a data content instance that is included in the second data asset and that is included in the third data record that includes the second data content instance from which the second token was generated, and
  one or more data values from a data content instance that is included in the second data asset and that is included in a fourth data record that includes the data content instance from which the second candidate token was generated;

determining that the second similarity score satisfies the similarity threshold; and performing, in response to the second similarity score satisfying the similarity threshold, a second modification to at least one of at least a portion of data content instances included in the first data record or at least a portion of data content instances included in the third data record.

17. The non-transitory machine-readable medium of claim 13, wherein the token for each data content instance of the first data asset is a sub-token computed for each data value in that data content instance that has the highest inverse document frequency of those sub-tokens in that data content instance.

* * * * *